July 20, 1954

C. E. OATES ET AL 2,684,216

CONTROL MECHANISM

Filed Nov. 13, 1950

INVENTORS:
CHARLES E. OATES
LEVI B. BROOKSHIRE

By Herbert E. Metcalf

THEIR PATENT ATTORNEY

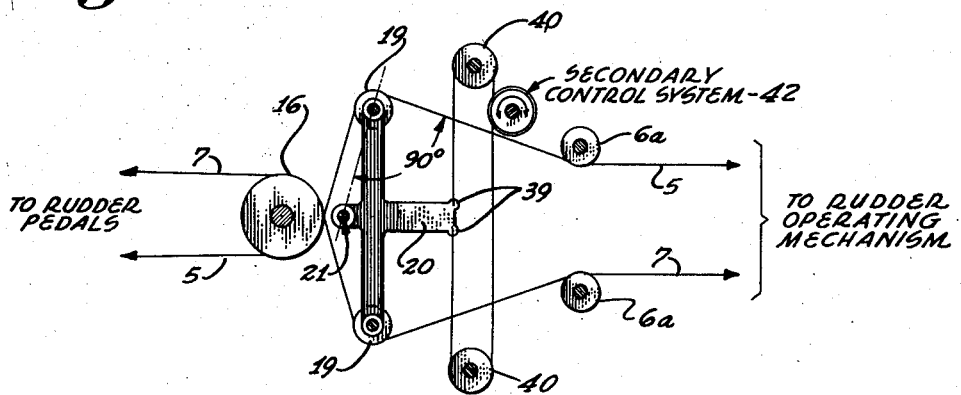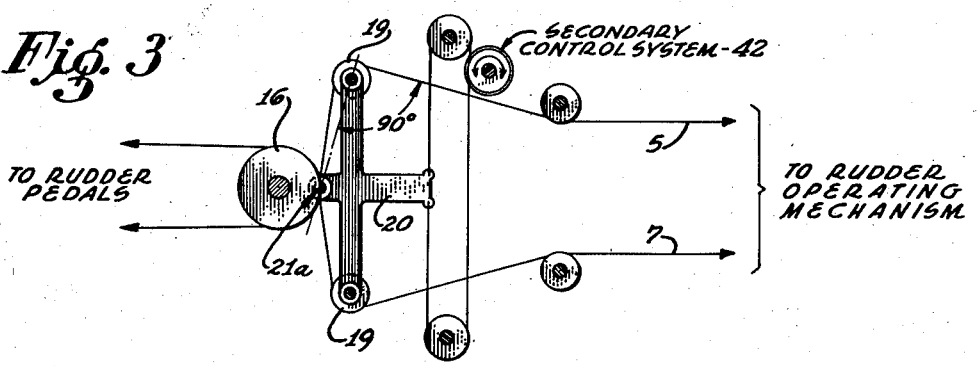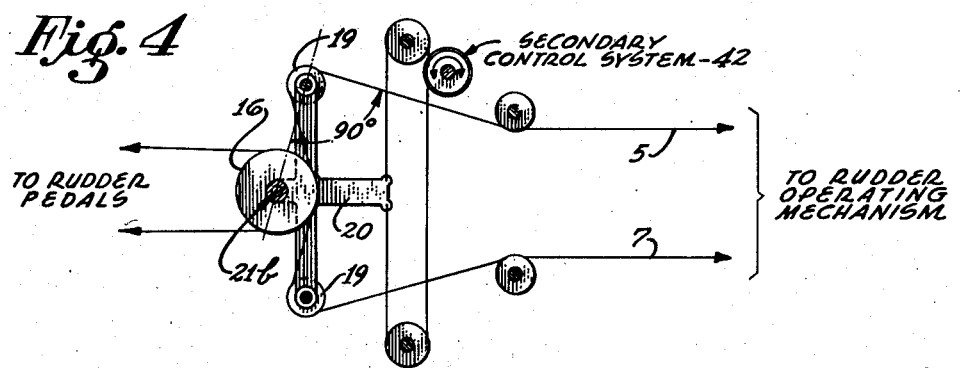

Patented July 20, 1954

2,684,216

UNITED STATES PATENT OFFICE 2,684,216

CONTROL MECHANISM

Charles E. Oates, Manhattan Beach, and Levi B. Brookshire, Gardena, Calif., assignors to Northrop Aircraft, Inc., Hawthorne, Calif., a corporation of California Application November 13, 1950, Serial No. 195,282

5 Claims. (Cl. 244—83)

1

This invention relates to control mechanisms, and, more particularly, to an auxiliary mechanism for connecting two mechanical input circuits to one output circuit so that each input or control circuit directly operates the output circuit completely independently of the other input. The invention is especially suited for use in an aircraft surface control system where an auxiliary control system is to move a surface, such as a rudder, for example, in addition to the normal pilot-controlled movements during flight.

In high performance airplanes, stability of the primary attitude control systems has become a major problem. At high wing loadings and high altitudes, for example, it has been found necessary to improve the yaw damping characteristics. The basic method of achieving the improvement has been to automatically move the rudder surface in response to an airplane disturbance. This is in addition to the normal automatic pilot, and should be accomplished so that the pilot is unaware of the automatic operation, except in noting the more desirable flying qualities of the airplane. It follows that the pilot's controls must move the rudder without opposition from the servo system which provides the yaw damping, and that the yaw damping system must move the rudder, as required, without motion of the rudder pedals.

A push-pull link in the normal pilot-operated control system may be made extendable and put under the control of a positioning motor for automatically moving the rudder to obtain yaw damping. However, this link and its connection to the yaw damper actuator may have two or more joints which are subject to lost motion in the form of backlash, or free play.

Therefore, an object of the present invention is to provide an intermediate mechanism for connecting in series two control input circuits to one control output circuit wherein no backlash can occur in the connecting mechanism.

Other objects of this invention are to provide a connecting mechanism for the purposes described having high efficiency and maximum rigidity (or minimum flexibility) so that a direct, positive control action can be maintained.

Additional objects and advantages will be apparent from the detail description of a specific apparatus embodying this invention, to follow.

Briefly, our invention comprises a cable and pulley system in which the two sides of the main cable control system pass around an idler pulley or pulleys rotatably mounted on a stationary base, diverge outwardly, and then each side makes

2 an approximate 90° turn around a separate auxiliary pulley, and continues toward the end of the main control system approximately parallel to the opposite side cable. The two auxiliary pulleys are rotatably mounted on opposite ends of a bellcrank which is rotatable about a point equidistant from the auxiliary pulleys. Means are provided to rotate the bellcrank in accordance with movements of a secondary control system, which in this embodiment is a yaw damper actuator.

The invention will be more fully understood by reference to the accompanying drawings showing preferred embodiments thereof, wherein:

Figure 2 is a schematic plan view showing the intermediate control mechanism in the rudder system of Figure 1.

Figures 3 and 4 are schematic plan views, similar to Figure 2, showing slightly modified versions of the control mechanism.

Figure 1:
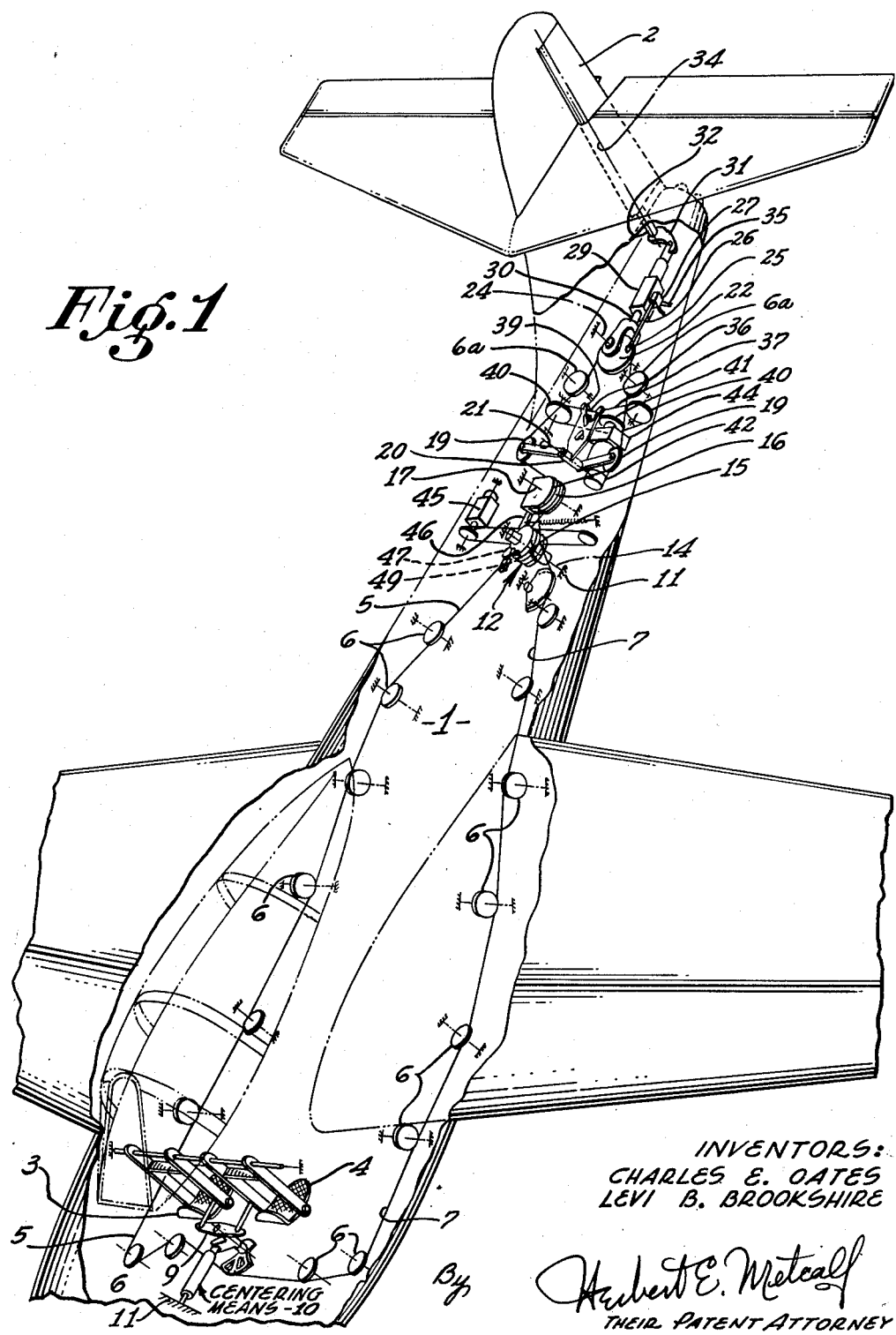
Figure 1 is a perspective view of an airplane fuselage showing in diagrammatic form a rudder control system having a yaw damping system connected to move the rudder with a mechanism of the present invention.

Referring directly to Figure 1 for a detailed description of our invention, an airplane fuselage 1 mounts a rudder 2 controlled by movement of pilot's rudder pedals 3 and 4 in the cockpit. When pushed forward, the right pedal 3 is connected in a conventional manner to pull a right-hand rudder cable 5 forward along the right side of the fuselage 1 over guiding pulleys 6. Similarly, a left-hand rudder cable 7 is pulled forward when the left pedal 4 is pushed forward, and the two pedals are interconnected in opposite-moving manner through a torque beam 9. Since the rudder actuating unit to be described is power-operated, with no feedback forces from the rudder surface, a two-way centering spring assembly 10 is connected to act between the fuselage structure 11 and the pedals 3 and 4 to provide a neutralizing force.

Toward the aft end of the fuselage 1, a cable drum 12 is mounted on a vertical drum axis 14 fixed to the structure 11. Drum grooves 15 are provided to carry the right-hand and left-hand cables 5 and 7. Passing to the rear, each of these cables crosses to the opposite side and turns around separate idler pulleys 16, each freely rotatable on a common axle 17. After this, the two cables 5 and 7 cross again and extend outwardly to lead around individual auxiliary pulleys 19 mounted on opposite sides of a bellcrank 20. The bellcrank 20 is located closely behind the idler pulleys 16 and is rotatably carried on a vertical bellcrank pivot 21. The auxiliary pulleys 19 are equidistant from the bellcrank pivot 21 and are positioned laterally opposite each other and slightly behind the pivot 21 when the controls are in neutral position.

The rudder cables 5 and 7 run rearwardly from the auxiliary pulleys 19 past rear guiding pulleys 6a and finally are attached on opposite sides of a control quadrant 22 rotatable about a fixed vertical quadrant axis 24. The quadrant 22 carries a rod connection 25 on one side thereof, to which a valve rod 26 of a hydraulic control valve 27 is connected. This valve 27 is secured on the side of a rudder actuating cylinder 29 containing a forwardly extending piston rod 30 pivotally attached to the fuselage by means of the quadrant axis 24.

Within the actuating cylinder 29, the piston rod 30 carries the customary piston (not shown), and the closed end of the cylinder 29 is rotatably connected to a rudder control arm 31 which is fastened to a rudder hinge line fitting 32 for rotating the rudder 2 about a vertical hinge line 34. Flexible hydraulic supply and return lines 35 connect to the control valve 27 for providing operating power to the cylinder 29.

The main rudder control system is thus described in general terms. When the bellcrank 20 is stationary, it is seen that the rudder pedals 3 and 4 cause the right and left-hand cables 5 and 7 to operate around the auxiliary pulleys 19 just as around the normal guiding pulleys 6 and 6a to rotate the quadrant 22 and thus move the valve rod 26 into or out of the control valve 27.

For rudder operation from a second control input, the bellcrank 20 carries a lever arm 36 to the end of which is attached a yaw damper cable assembly 37 extending at right angles to the lever arm 36. Two cable attachment points 39 on the arm 36 are provided, so that the damper cable 37 may rotate the bellcrank 20 without the backlash which could occur at the attachment, if only one were used, during reversals of direction.

The damper cable 37 leads around secondary pulleys 40 to attach to an output sheave 41 driven by a yaw damper actuator 42. This actuator 42 is energized by a yaw-controlling servo system, which forms no part of the present invention, however. The servo control system may comprise a rate gyro designed to develop an electrical signal voltage proportional to the rate of yaw and/or side-slip of the airplane. This voltage then passes through a servo-amplifier to operate the electrical actuator 42.

To provide sufficient rudder movement to counteract the yawing tendencies, a maximum range of ten degrees rudder travel is usually required to be attained by the damper mechanism, thus allowing five degrees of rudder deflection on each side of a neutral damper position. The present invention accommodates this range very well.

Operation of the damper actuator 42 rotates the bellcrank 20 about its bellcrank pivot 21 to displace the auxiliary pulleys 19 in opposite fore-and-aft directions and thus cause actuation of the right and left-hand rudder cables 5 and 7 aft of the bellcrank 20. Forward of the bellcrank, the rudder cables 5 and 7 merely wrap or unwrap around the idler pulleys 16. This action takes place because of the very low force required to operate the valve rod 26 in this full-power control system. The auxiliary mechanism is located as close as possible to the rudder actuating cylinder 29 to obtain short cable lengths, minimum friction, and maximum rigidity. The rear guiding pulleys 6a, if necessary because of space limitations such as in the tail section of the fuselage 1, are positioned so that each rudder cable extending rearwardly from the bellcrank 20 makes substantially a 90° angle with the line joining the center of its respective auxiliary pulley 19 to the bellcrank pivot 21, at the center rudder position, so that maximum rudder movement is obtained from a given damper actuator 42 movement.

The output of the yaw damper actuator 42 should be through an irreversible driving assembly 44 before connecting with the output sheave 41, so that normal rudder control by the rudder cables 5 and 7 will not disturb the servo mechanism position, but will move only the rudder 2.

Referring again to Figure 1, an auto-pilot servo unit 45 is shown cable-connected to the cable drum 12. This illustrates the preferred location of the autopilot driving mechanism in a control system using the present invention. The cables to this unit 45 thus move in synchronism with the main control cables 5 and 7, and the rudder pedals 3 and 4. That is, the drive pulley of the autopilot unit 45 is directly connected to rotate, by means of the unitary drum 12, when the rudder pedals 3 and 4 are operated. When the autopilot unit 45 is "off," it free wheels with the manual system, and vice versa, according to conventional practice. The small amount of friction in the autopilot cable and pulley system, when acting on the main control system at a point adjacent to the idler pulleys 16, helps to prevent the tendency for the rudder control cables 5 and 7 forward of the bellcrank 20 to move when the damper actuator 42 changes the valve rod 26 position. The centering spring assembly 10 of course resists this forward cable movement tendency in response to damper actuator movement also.

If more restraint is desired forward of the idler pulley 16, a pivoted spring-loaded bar 46 may be installed so that a roller 47 carried at its unpivoted end is designed to engage a cut-out 49 in the cable drum 12 when the rudder 2 is in neutral. Since the majority of the flight trip time is made with the rudder neutral, the roller 47 and cut-out 49 aid in isolating the yaw damping operation from the remainder of the main control cable system, so that better efficiency is attained by the damping system. This cable drum restraint, however, must not be strong enough to interfere with the pilot's operations of the rudder pedals.

It is thus seen that a simple auxiliary, or secondary, control mechanism has been provided by the present invention. An important feature of this mechanism is that no backlash whatsoever can occur in the connection of the damping system to the rudder operating mechanism. The rudder control cables 5 and 7 are smoothly operated in yaw damping movements with no lost motion and a minimum of required power.

Several other forms of this invention will be readily apparent to persons skilled in the art. Figure 2 shows the same control mechanism geometry as in Figure 1. In Figure 3, for example, the bellcrank pivot 21a is moved forward to a point on the circumference of the idler pulleys 16. In Figure 4, the bellcrank pivot 21b is at the center of rotation of the idler pulleys 16. While the paths of motion of the respective points on the rudder cables 5 and 7 next to the forward side of the auxiliary pulleys 19, as the bellcrank 20 is rotated, do not exactly conform to involute curves of the circle represented by the idler pulleys 16, which would be the ideal condition, still this ideal condition is very closely approached for a small angular deflection of the bellcrank 20 from its neutral position. For the relatively small angle (about 9° total) through which the bellcrank 20 is required to turn for yaw damping in the presently used system configuration, any of the illustrated geometrical forms are satisfactory. To obtain the most nearly equal amount of simultaneous cable wrap and unwrap about the idler pulleys 16 when the bellcrank 20 is rotated from a central position, the configurations of Figures 2 and 3 seem to be preferable. Another possible configuration, for example, is to employ two sets of idler pulleys rotatable about separate axes, instead of the idler pulleys 16 shown herein as being mounted on the common axle 17.

The important point to be understood is that the present invention is not limited to any one specific form, but it is possible to adopt other forms and modifications. Also, other types of control systems may be substituted in place of the yaw damper device, such as a control surface trim system, for example. In fact, this invention is not limited to aircraft use only, but can be used in any control system where independent control of a single output is required from more than one input.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In an airplane having a rudder connected for movement in two directions by a two-cable rudder control system having means actuated by the pilot, a yaw damper control mechanism comprising a yaw damper actuator, a bellcrank member rotatable on a fixed axis in said airplane, said actuator having a driving connection with said bellcrank for rotating said bellcrank in either of two directions, two control pulleys rotatable on separate axes on said bellcrank on substantially opposite sides thereof and equidistant from said fixed axis, idler pulley means also rotatable in said airplane and located adjacent to said bellcrank, the two cables of said rudder control system passing from the pilot actuated means, around opposite respective sides of said idler pulley means, then diverging and passing, respectively, around said control pulleys to lead to said rudder, the point of contact of each of said cables on the side of its control pulley nearest said idler pulley means having a path of motion defined by an approximate involute curve about said idler pulley means when said bellcrank is rotated a relatively small amount, whereby said yaw damper actuator can control said rudder automatically and independently of the pilot, wherein said idler pulley means is mounted on only a single idler axis in said airplane, said two rudder cables curving inwardly around opposite sides of said idler pulley means and crossing to extend to said control pulleys.

2. In an airplane having a rudder connected for movement in two directions by a two-cable rudder control system having means actuated by the pilot, a yaw damper control mechanism comprising a yaw damper actuator, a bellcrank member rotatable on a fixed axis in said airplane, said actuator having a driving connection with said bellcrank for rotating said bellcrank in either of two directions, two control pulleys rotatable on separate axes on said bellcrank on substantially opposite sides thereof and equidistant from said fixed axis, idler pulley means also rotatable in said airplane and located adjacent to said bellcrank, the two cables of said rudder control system passing from the pilot actuated means around opposite respective sides of said idler pulley means, then diverging and passing, respectively, around said control pulleys to lead to said rudder, the point of contact of each of said cables on the side of its control pulley nearest said idler pulley means having a path of motion defined by an approximate involute curve about said idler pulley means when said bellcrank is rotated a relatively small amount, whereby said yaw damper actuator can control said rudder automatically and independently of the pilot, wherein said driving connection does not permit rotation of said yaw damper actuator and said bellcrank when said rudder is moved by reciprocal motion of said rudder control cables, and including a follow-up member connected to move with said rudder control cables on the pilot's side of said idler pulley means, a detent in said follow-up member, a lever arm pivoted on said airplane, elastic means connected to urge said lever arm against said follow-up member at all times, and a roller-shaped member projecting from said lever arm and positioned to engage with said detent at a neutral follow-up position, only, in a semi-latching condition, whereby reciprocal motion of said rudder cables from neutral is restrained when said bellcrank is rotated in either direction by said yaw damper actuator.

3. A mechanical linkage comprising a first actuator, a device to be actuated, two oppositely moving taut cables connected to said first actuator at one end and to said device at the other end, idler pulley means freely rotatable on only a single idler axis fixed to a structural support, a bellcrank member rotatable on an axis which is parallel to said idler axis and fixed to said support, said bellcrank having two substantially oppositely extending arms thereon, two auxiliary pulleys rotatably mounted one on each of said arms at points equidistant from said bellcrank axis, said cables leading from said first actuator to opposite respective sides of said idler pulley means and passing partially therearound, then curving inwardly from opposite sides of said idler pulley means and crossing to extend respectively to the outer sides of said auxiliary pulleys, and passing partially therearound to lead to said device, the point of contact of each of said cables on the side of its auxiliary pulley nearest said idler pulley means having a path of motion defined by an approximate involute curve of the idler pulley means about which it is turned when said bellcrank is rotated a relatively small amount, a second actuator, and positive driving means connected between said second actuator and said bellcrank to rotate said bellcrank, said bellcrank axis being located adjacent to the circumference of said idler pulley means substantially at the crossing point of said cables.

4. A mechanical linkage comprising a first actuator, a device to be actuated, two oppositely moving taut cables connected to said first actuator at one end and to said device at the other end, idler pulley means freely rotatable on only a single idler axis fixed to a structural support, a bellcrank member rotatable on an axis which is parallel to said idler axis and fixed to said support, said bellcrank having two substantially oppositely extending arms thereon, two auxiliary pulleys rotatably mounted one on each of said arms at points equidistant from said bellcrank axis, said cables leading from said first actuator to opposite respective sides of said idler pulley means and passing partially therearound, then curving inwardly from opposite sides of said idler pulley means and crossing to extend respectively to the outer sides of said auxiliary pulleys, and passing partially therearound to lead to said device, the point of contact of each of said cables on the side of its auxiliary pulley nearest said idler pulley means having a path of motion defined by an approximate involute curve of the idler pulley means about which it is turned when said bellcrank is rotated a relatively small amount, a second actuator, and positive driving means connected between said second actuator and said bellcrank to rotate said bellcrank, said bellcrank axis being located beyond the circumference of said idler pulley means toward said device to be actuated, substantially symmetrical with the cables extending from said idler pulley means to said auxiliary pulleys.

5. A mechanical linkage comprising a first actuator, a device to be actuated, two oppositely moving taut cables connected to said first actuator at one end and to said device at the other end, idler pulley means freely rotatable on only a single idler axis fixed to a structural support, a bellcrank member rotatable on an axis which is parallel to said idler axis and fixed to said support, said bellcrank having two substantially oppositely extending arms thereon, two auxiliary pulleys rotatably mounted one on each of said arms at points equidistant from said bellcrank axis, said cables leading from said first actuator to opposite respective sides of said idler pulley means and passing partially therearound, then curving inwardly from opposite sides of said idler pulley means and crossing to extend respectively to the outer sides of said auxiliary pulleys, and passing partially therearound to lead to said device, the point of contact of each of said cables on the side of its auxiliary pulley nearest said idler pulley means having a path of motion defined by an approximate involute curve of the idler pulley means about which it is turned when said bellcrank is rotated a relatively small amount, a second actuator, and positive driving means connected between said second actuator and said bellcrank to rotate said bellcrank, said bellcrank axis being located within the circumference of said idler pulley means substantially symmetrical with the cables extending from said idler pulley means to said auxiliary pulleys.

References Cited in the file of this patent

UNITED STATES PATENTS

| Number | Name | Date |
|---|---|---|
| 1,992,970 | Sperry | Mar. 5, 1935 |
| 2,182,648 | Solomon | Dec. 5, 1939 |
| 2,183,932 | Carlson | Dec. 19, 1939 |
| 2,542,946 | Ross | Feb. 20, 1951 |